May 30, 1939.  B. S. AIKMAN  2,160,189
BRAKE CONTROL MEANS
Filed Nov. 24, 1937  2 Sheets-Sheet 2
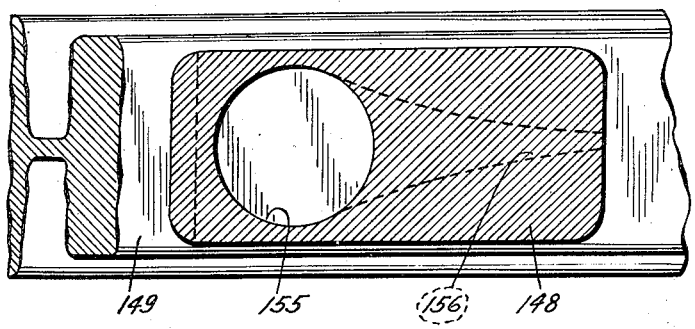
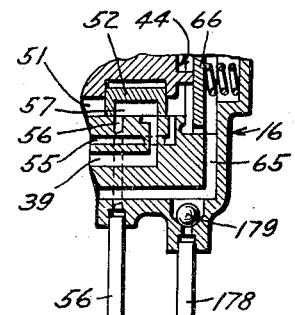
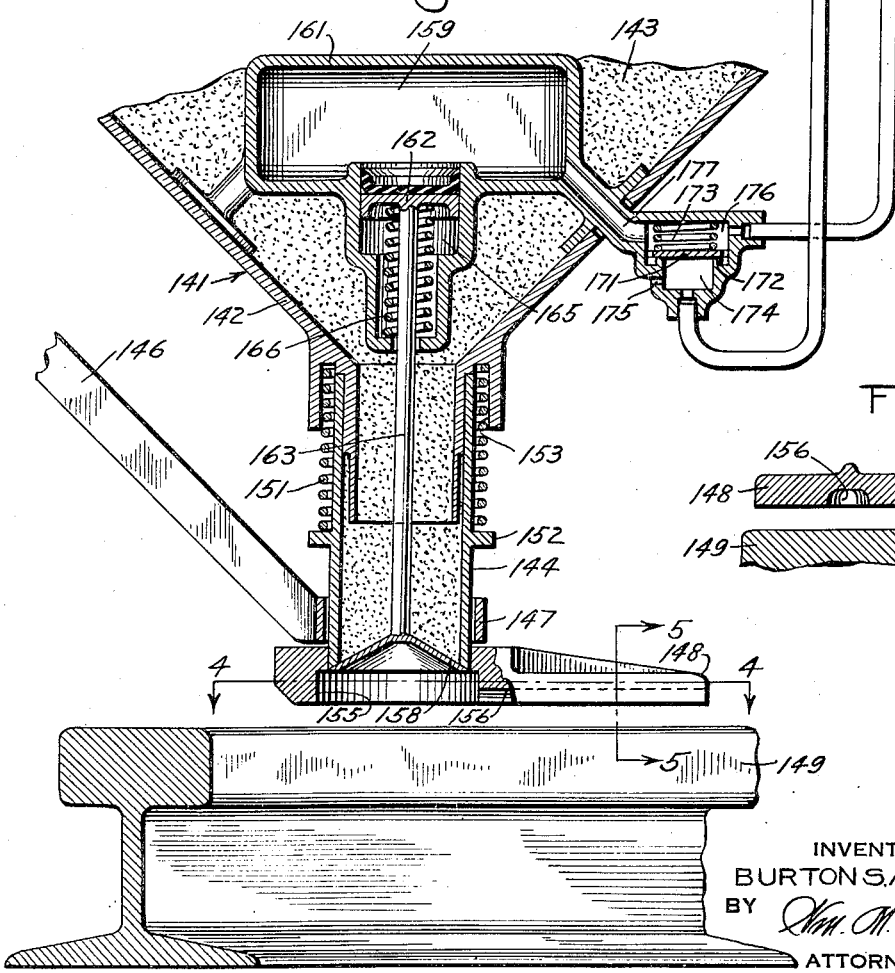
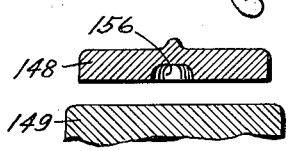
INVENTOR
BURTON S. AIKMAN
BY Wm. M. Cady
ATTORNEY Patented May 30, 1939

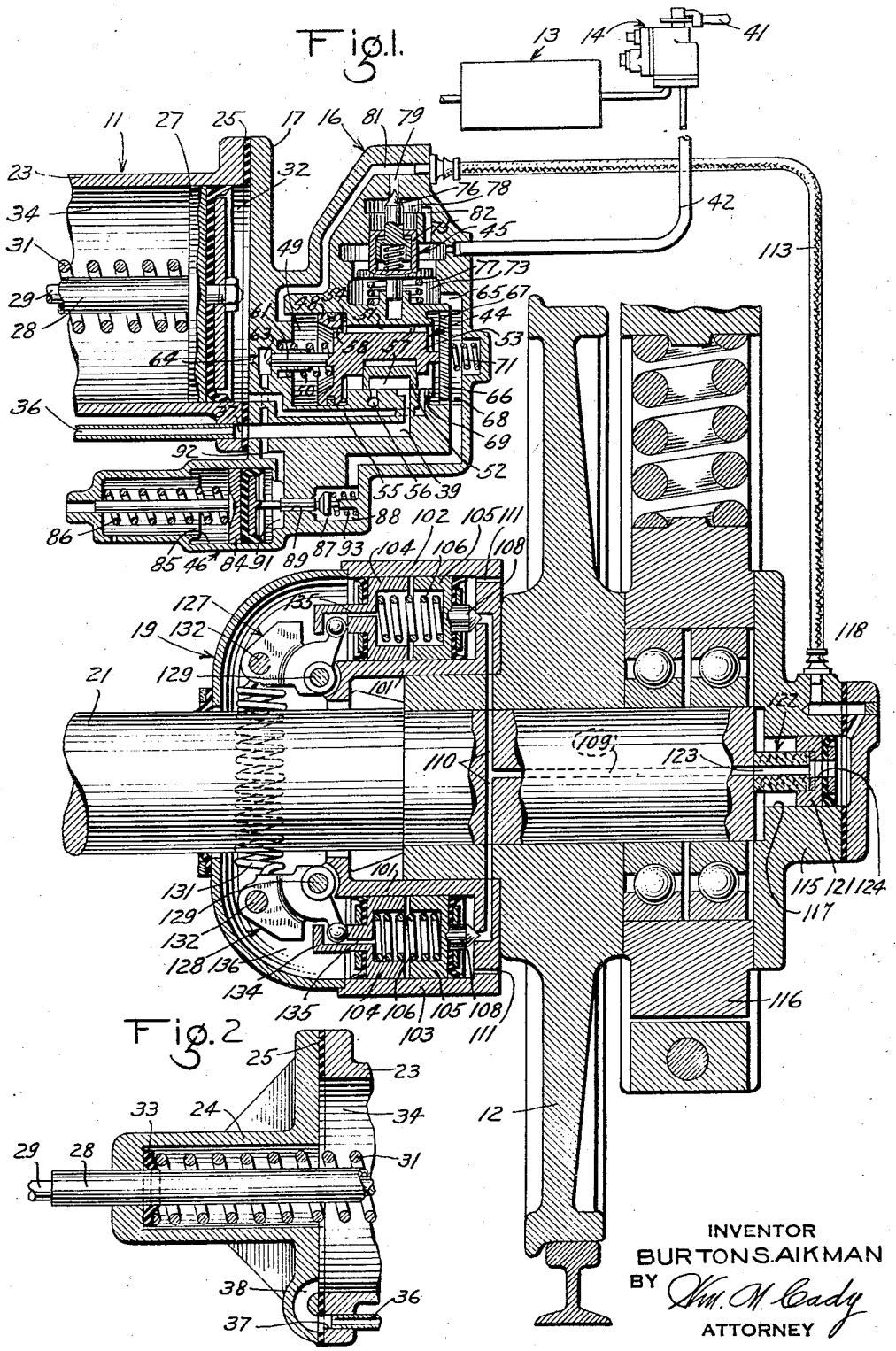

2,160,189

UNITED STATES PATENT OFFICE 2,160,189

BRAKE CONTROL MEANS

Burton S. Aikman, Wilkinsburg, Pa., assignor to The Westinghouse Air Brake Company, Wilmerding, Pa., a corporation of Pennsylvania Application November 24, 1937, Serial No. 176,184

23 Claims. (Cl. 303—21)

This invention relates to brake control means for vehicles such as railway cars and particularly to brake control means for guarding against sliding of the car wheels.

In the co-pending application Serial No. 150,920 of Ellery R. Fitch, filed June 29, 1937, now Patent 2,132,914, assigned to the assignee of the present application, there is disclosed a brake control equipment for guarding against sliding of the car wheels, which equipment functions to release fluid under pressure from the pressure side of the brake cylinder piston and simultaneously therewith to supply fluid under pressure to the usual non-pressure side of the brake cylinder piston upon slipping of the car wheels to effect a rapid release of the brakes on the slipping wheels, thereby causing the slipping wheels to accelerate back to a speed corresponding to vehicle speed before attaining a locked-wheel state. In the present application, a wheel is said to slip when it rotates at a speed less than a speed corresponding to the vehicle speed. When a vehicle wheel is locked against rotation and drags along an associated rail by movement of the car or vehicle, the wheel is said to slide. The interval of time which elapses between the time that a wheel commences to slip up to the time it reaches the locked-wheel state is known as the slipping time or period.

In the patent mentioned above, the control means for supplying and releasing fluid under pressure to and from the pressure and non-pressure side of the brake cylinder piston is electro-pneumatic in character. It is an object of my present invention to provide brake control means, for guarding against sliding of car wheels, which is wholly pneumatic in character.

Another object of my invention is to provide a brake control means effective, upon slipping of a car wheel, to cause fluid under pressure to be supplied from the pressure side of the brake cylinder piston to the usual non-pressure side, and effective to limit the maximum pressure on the pressure side of the brake cylinder piston, upon acceleration of the car wheel back to a speed corresponding to car speed following slipping of the wheel, to the pressure of equalization between the pressure and non-pressure sides of the brake cylinder piston.

Another object is to provide a brake control equipment of the character indicated in the foregoing object and including means for insuring that the pressure restored on the pressure side of the brake cylinder piston, after slipping of the car wheels ceases, is at least a certain minimum pressure.

The above objects, and other objects of my invention which will be made apparent hereinafter, are obtained by several embodiments subsequently to be described and shown in the accompanying drawings wherein:

Fig. 1 is a diagrammatic view, with parts thereof in section, illustrating one embodiment of my invention.

Fig. 2 is a fragmentary sectional view showing, in further detail, the construction of the brake cylinder fragmentarily shown in Fig. 1.

Fig. 3 is a fragmentary sectional view showing another embodiment of my invention including a rail sanding device, and Figs. 4 and 5 are sectional views taken on the lines 4—4 and 5—5, respectively, of Fig. 3.

*Description of embodiment shown in Fig. 1*

The equipment shown in Fig. 1 comprises a brake cylinder 11 for applying brake shoes, not shown, to one or more car wheels 12 only one of which is shown, a reservoir 13 hereinafter referred to as the main reservoir, a self-lapping brake valve device 14 for controlling the supply of fluid under pressure from the main reservoir 13 to the brake cylinder 11 and the release of fluid under pressure from the brake cylinder, for effecting the usual application and release of the brakes.

Acording to my invention, the equipment further includes a valve unit 16 preferably embodied in a casing provided with a flange 17 adapted to be bolted to the end of the brake cylinder 11 in place of the usual pressure head, and a governor-operated valve mechanism 19, associated with the axle 21 of the vehicle wheel 12, for controlling the operation of the valve unit 16.

Considering the parts of the equipment in greater detail, the brake cylinder 11 comprises a main tubular portion 23 having flanges at the opposite ends thereof to one of which the flange 17 of the valve unit casing is attached and to the other of which an end cover 24 is suitably secured as by bolts not shown, gaskets 25 being provided for sealing the joints between the parts against leakage. Contained and reciprocative in the tubular portion 23 of the brake cylinder is a brake cylinder piston 27 of any suitable construction which has attached thereto a hollow stem 28 for receiving a push rod 29 therein in the usual manner, the push rod 29 being connected through suitable brake rigging levers to the brake shoes for effecting application of the brake shoes to the rim of the vehicle wheels 12 upon movement of the brake cylinder piston 27 in the left-hand direction in response to an increase of fluid pressure in chamber 32 on the right-hand or pressure side of the piston.

The usual release spring 31 is interposed between the piston 27 and the end cover 24 for effecting the return of the piston 27 in the right-hand direction to cause release of the brakes upon the release of fluid under pressure from the chamber 32 at the pressure side of the piston, or upon substantial equalization of the pressures on opposite sides of the brake cylinder piston. A suitable annular packing gasket 33 is associated with the stem 28 of the piston 27 to prevent leakage of fluid under pressure from a chamber 34 at the left-hand or usual non-pressure side of the piston 27 through the opening in the end cover 24 in which the stem 28 is guided.

The brake cylinder 11 further comprises a pipe or conduit 36 which extends in adjacent parallel relation to the tubular portion 23 of the brake cylinder and which connects ports 37 in the flanges at the opposite ends of the tubular portion 23. The port 37 in one flange registers with a passage 38 in the end cover 24 which opens into the chamber 34 at the non-pressure side of the brake cylinder piston 27, and the port 37 in the opposite flange registers with a passage 39 in the casing of the valve unit 16.

The self-lapping brake valve device 14 is preferably of the type described in the Patent 2,042,112 of Ewing K. Lynn and Rankin J. Bush. Since reference may be had to the above-mentioned patent for the details of construction of the brake valve device 14, it is deemed sufficient for the purposes of the present application to understand only that brake valve 14 comprises an operating handle 41 which is normally in a brake release position and which is operative out of its normal position, in a horizontal plane through an arc, referred to as the application zone, to varying degrees to effect operation of self-lapping valve means to establish a pressure in a pipe 42 leading to the valve unit 16 which corresponds substantially to the degree of displacement of the handle from its normal brake release position. It should be kept in mind that the self-lapping brake valve device 14 is in the nature of a pressure-maintaining device, that is, it is effective to maintain a pressure in the pipe 42, corresponding to the degree of displacement of the handle 41 from its normal release position, in the event of leakage from the pipe 42.

The valve unit 16 comprises a so-called release and reapplication valve device 44, a charging valve device 45 and a pressure maintaining valve device 46.

The release and reapplication valve device 44 comprises a piston 48 having at one side a piston chamber 49 and at the opposite side a slide valve chamber 51 in which is contained a slide valve 52 operated by movement of the piston through the medium of a stem 53 of the piston. A spring 50, interposed between the piston 48 and the casing in the piston chamber 49, yieldingly urges the piston in the right-hand direction to a normal position determined by the engagement of the piston with a shoulder 54 formed in the slide valve chamber 51.

The slide valve chamber 51 is constantly connected to the chamber 32 at the pressure side of the brake cylinder piston 27 by a relatively large passage 55. With the piston 48 in its normal position as shown, the slide valve 52 is positioned to connect the passage 39, which opens at the seat of the slide valve, to an exhaust port 56 through a cavity 57 in the slide valve. When the slide valve 52 is shifted in the left-hand direction a maximum extent, the exhaust port 56 is lapped and the passage 39 is uncovered and opened to the slide valve chamber 51, thereby establishing communication between the chamber 32 on the pressure side of the brake cylinder piston and the chamber 34 on the usual non-pressure side of the piston by way of the passage 55, slide valve chamber 51, passage 39, and pipe 36.

The piston 48 has a restricted port 58 therein through which fluid under pressure may flow from the slide valve chamber 51 to the piston chamber 49 to charge chamber 49 with fluid under pressure for the purpose to be hereinafter made clear.

Affixed to or formed integral with the piston 48 is a pin valve 61 which engages a cooperating valve seat formed in the casing of the valve unit 16 and thereby limits the movement of the piston 48 in the left-hand direction against the force of the spring 50. The pin valve 61 controls communication through a port 64 between the chamber 32 on the pressure side of the brake cylinder piston 27 and a chamber 63, the chamber 63 being supplied with fluid under pressure under the control of the maintaining valve device 46 in the manner to be presently described. The purpose of the pin valve 61 will be made apparent hereinafter.

The slide valve chamber 51 is normally open to a supply passage 65 past a one-way or check valve 66 which is provided with a plurality of grooves 67 around the periphery thereof to enable flow of fluid under pressure from the supply passage 65 to the slide valve chamber 51 past the valve 66 through a bore 68 in which the valve 66 is guided.

With the piston 48 in its normal right-hand position, as shown, the end of the stem 53 of the piston engages the valve 66 and unseats it from an associated annular rib seat 69 against the yielding resisting force of a coil spring 71. When the piston 48 is shifted in the left-hand direction a distance which is insufficient for the slide valve 52 to uncover the passage 39, the check valve 66 is seated on the annular rib seat 69 by the spring 71, thus preventing the supply of fluid under pressure from the supply passage 65 to the slide valve chamber 51.

The supply passage 65 opens into a chamber 73 in the casing of the valve unit to which the pipe 42 from the brake valve device 14 is connected. Accordingly, when the brake valve 14 is operated to supply fluid under pressure into the pipe 42, fluid under pressure flows from the pipe 42 into the chamber 73 and thence to the chamber 32 on the pressure side of the brake cylinder piston 267 by way of the supply passage 65, past the unseated check valve 66, slide valve chamber 51 and passage 55.

The restricted port 58 in the piston 48 is too small to enable rapid equalization of the pressure in the piston chamber 49 and slide valve chamber 51 and, accordingly, the charging valve device 45 is provided for supplying fluid under pressure from the chamber 73 and the supply pipe 42 to the piston chamber 49 as rapidly as it is supplied to the slide valve chamber 51.

The charging valve device 45 comprises a valve piston 75, including a pin valve 76, and a coil spring 77 interposed between the valve piston 75 and the casing for yieldingly urging the valve piston upwardly and causing the pin valve 76 to seat on an associated valve seat formed in the casing. When the pin valve 76 is unseated it establishes communication through a port 79 from a chamber 78 to a passage 81 leading to the piston chamber 49. The chamber 78 is constantly connected to the chamber 73 through a passage 82 and thus, when the pin valve 76 is unseated, fluid under pressure is supplied from the pipe 42 to the piston chamber 49.

The valve piston 75 has a head or flange conforming closely in cross-sectional area to that of the chamber 73 and interposed between the supply pipe 42 and the supply passage 65. Fluid under pressure supplied into the chamber 73 from the supply pipe 42 may thus flow only at a restricted rate, past the head of the valve piston 75, to the supply passage 65 and, accordingly, a pressure differential is built up on the valve piston 75 which causes it to be actuated downwardly against the yielding force of the spring 77. As the valve piston 75 moves downwardly, the head of the valve piston moves into a portion of the chamber 73 of larger cross-sectional area, thereby permitting a more rapid flow of fluid under pressure past the head of the valve piston from the supply pipe 42 to the supply passage 65. At the same time, downward movement of the valve piston 75 unseats the pin valve 76 and thus fluid under pressure is simultaneously rapidly supplied from the supply pipe 42 to the slide valve chamber 51 and to piston chamber 49 on opposite sides of the piston 48.

It will thus be clear that under normal circumstances, the piston 48 remains in the right-hand position shown, under the influence of the spring 50, during an application of the brakes because the fluid pressure is built up at a substantially uniform rate on opposite sides of the piston.

The pressure maintaining valve device 46 comprises a piston 84 which is suitably guided in a bore 85 formed in the casing of the valve unit 16 and which is yieldingly urged in the right-hand direction by a coil spring 86 at one side thereof to effect unseating of a poppet valve 87 contained in a chamber 88 into which the supply passage 65 opens. When the poppet valve 87 is unseated, it establishes communication therepast through a port 89, in which the fluted stem of the valve 87 is guided, to a chamber 91 at the side of the piston 84 opposite to the spring 86. Chamber 91 is connected through a passage 92 to the chamber 63 previously referred to.

The coil spring 86 is so designed and so tensioned that when the pressure of the fluid supplied from the passage 65 past the valve 87 into the chamber 91 and acting on the piston 84 attains a certain pressure, such as thirty pounds per square inch, the spring 86 is overcome and the piston 87 is shifted in the left-hand direction. As a result, the poppet valve 87 is seated under the influence of a biasing spring 93 to close off the further supply of fluid under pressure from the passage 65 to the chamber 91. Since the chamber 91 of the maintaining valve device 46 is connected to the chamber 32 on the pressure side of the brake cylinder piston 27 by way of the passage 92, chamber 63 and port 64, it will be apparent that with the pin valve 61 unseated, fluid may be supplied from the supply passage 65 to the chamber 32 on the pressure side of brake cylinder piston 27 until the pressure in chamber 32 attains the pressure determined by the setting of the maintaining valve device 46.

It is intended that the pressure at which the poppet valve 87 of the maintaining valve device 46 is seated to close off the supply of pressure from the supply passage 65 to the chamber 32 on the pressure side of the brake cylinder piston be selected sufficiently low as to be ineffective to cause slipping or sliding of the car wheels and, at the same time, provide sufficient pressure to bring the car to a stop. The functions of the maintaining valve device 46 will be explained more fully hereinafter.

The governor-operated valve mechanism 19 is provided for effecting a rapid release of fluid under pressure from the piston chamber 49 of the valve unit 16 when the vehicle wheel 12 begins to slip. The governor mechanism 19 comprises a casing including an annular portion 101 which is keyed or otherwise suitably fixed to the inner reduced end of the hub of the vehicle 12 that is pressed on or keyed to the outer end of the axle 21. Suitably formed in the casing portion 101 at diametrically opposite sides of the axle 21 are cylinders 102 and 103, each of which contains a pair of oppositely facing pistons 104 and 105 between which is interposed a coil spring 106 that yieldingly urges the pistons 104 and 105 in opposite directions. A pin valve 108 is formed on or attached to the outer face of each of the pistons 105 and is normally urged into seated relation on a cooperating valve seat. When the pin valves 108 are unseated, they establish communication through which fluid under pressure may be exhausted from a passage 109 in the axle 21. As will be seen in Fig. 1, the passage 109 has two branches 110 which open into the inner end of the cylinders 102 and 103 respectively, the space between the pistons 105 and the end of the cylinders being constantly open to atmosphere through a port 111.

The passage 109 in the axle 21 is constantly connected to the passage 81 and piston chamber 49 in the casing of valve unit 16 by a flexible conduit or pipe 113. As will be seen in Fig. 1, one end of the conduit 113 is connected to passage 81 in the casing of the valve unit 16 and the other end is connected to a passage 118 in an end cover 115 which is secured to the ball-bearing housing 116 associated with the end of the axle 21. The end cover 115 is provided with a counterbore 117 which is open to the end of the axle 21 at one end, the opposite end being open to passage 118. Contained in the counterbore 117 is a piston 121 which carries a self-lubricating packing or gland 122, in the form of a cylinder of carbon or other suitable material. The packing 122 has a central passage 123 therein which registers at one end with the passage 109 in the axle 21 and at the opposite end with a central passage 124 in piston 121.

It will be seen that when fluid under pressure is supplied to the passage 81 of the valve unit 16, it flows through the conduit 113 to the face of the piston 121 and exerts a force thereon to press the packing 122 against the end of the axle 121 to maintain a seal therewith against leakage of fluid under pressure as supplied through the passages 124 and 123 in the piston and packing, respectively, to the passage 109 to the axle. When pressure on the piston 121 is released, the packing is not pressed to the end of the axle and thus no wear on the packing occurs except when the piston is subject to pressure.

The governor mechanism further comprises a pair of weighted levers 127 and 128, similar in form to bell-crank levers, and pivoted at the fulcrum thereof on pins or shafts 129 that are supported in suitable yokes on the end of the annular portion 101 of the casing. One arm of each of the levers 127 and 128 is weighted at the outer end thereof, and the two weighted arms are yieldingly biased or urged toward each other by a pair of coil springs 131 located on opposite sides of the axle 21, only one of the springs 131 being shown. Each of the springs 131 is secured at opposite ends to pins 132 in the outer end of the weighted arms of the levers 127 and 128.

The end of the other arm of the levers 127 and 128 is connected by a universal joint to the end of a stem 134 of the piston 104 in the cylinders 102 and 103, respectively.

Thus, when the weighted arms of the levers 127 and 128 move outwardly from the axle with an increase in the speed of rotation of the car wheel 12 and axle 21, the pistons 104 are shifted in the right-hand direction. Conversely, when the weighted arms of the levers 127 and 128 move inwardly toward the axle 21 with a decrease in the speed of rotation of the wheel 12 and axle 21, the pistons are shifted in the left-hand direction.

Each piston 104 is provided with a restricted port 135 which restricts the rate of flow of air at atmospheric pressure from the chamber 136 in the casing of the governor mechanism to the space between itself and its associated piston 105, when the piston 104 moves in the left-hand direction as seen in Fig. 1.

The size of the port 135 in the piston 104 is such that if the car wheel 12 and axle 21 reduce in speed rotatively at a rate of change not exceeding a certain normal rate, air at atmospheric pressure may flow from the chamber 136 through the port 135 to the space between the pistons 104 and 105 rapidly enough to prevent the creation of a partial vacuum in the space between the pistons. If, however, the car wheel 12 and car axle 21 reduce in speed at a rate exceeding the normal rate, as when the car wheel 12 slips, that is, decelerates from a speed corresponding to vehicle speed toward the locked-wheel state while the car is still in motion, a partial vacuum will be created in the space between the pistons 104 and 105 due to the restriction of the port 135 to the flow of air at atmospheric pressure into the space between the pistons 104 and 105. Since the outer face of the pistons 105 are subject to atmospheric pressure through the port 111, the pistons 105 are accordingly shifted in the left-hand direction, against the yielding resistance of spring 106, to unseat the pin valves 108, upon the creation of sufficient partial vacuum in the space between pistons 104 and 105.

It will thus be seen that the governor mechanism 19 functions normally, as long as the car wheel 12 does not slip, to maintain the pin valves 108 seated and is effective, only when the car wheel 12 slips, to effect unseating of the pin valves 108 to release fluid under pressure from the passage 109 in the axle 121 and correspondingly from the passage 81 and piston chamber 49 of the valve unit 16.

*Operation of embodiment shown in Fig. 1*

Assuming that the main reservoir 13 is charged to the normal pressure carried therein from a fluid compressor not shown, and that the car or train is traveling along the road with the handle 41 of the brake valve device 14 in brake releasing position so that the brakes are correspondingly released, the operator may effect an application of the brakes by shifting the handle 41 of brake valve device 14 into the application zone to effect an application of the brakes. Fluid under pressure is accordingly supplied from the reservoir 13 into the supply pipe 42 and thence to the chamber 32 on the pressure side of the brake cylinder piston 27 by way of chamber 73, passage 65, past the unseated check valve 66, slide valve chamber 51 and passage 55. As previously pointed out, the charging valve device 45 operates to supply fluid under pressure from chamber 73 to the piston chamber 49 to equalize the pressures in the piston chamber 49 and slide valve chamber 51 and thus maintain the piston 48 and slide valve 52 in the position shown, wherein the chamber 34 at the usual non-pressure side of the brake cylinder piston 27 is vented to atmosphere by way of the passage 38, pipe 36, passage 39, cavity 57 in slide valve 52 and exhaust port 56.

Fluid under pressure is also supplied from passage 65 to the chamber 32 at the pressure side of the brake cylinder piston 27 past the unseated valve 87 of the pressure maintaining valve device 46, through the bore 89, chamber 91, passage 92, chamber 63 and port 64, until such time as the piston 84 of the pressure maintaining valve device 46 is shifted in the left-hand direction by the pressure of the fluid in chamber 91 to effect seating of the valve 87 to cut off the further supply of fluid under pressure therepast to the chamber 32.

Assuming that car wheel 12 does not slip, a pressure will be established in the chamber 32 at the pressure side of the brake cylinder piston 27 which corresponds to the degree of displacement of the operating handle 41 of the self-lapping brake valve device 14 out of its normal release position, and the brakes will be applied to a corresponding degree.

If it is desired to release the brakes, the operator merely returns the operating handle 41 of the brake valve device 14 to release position. Fluid under pressure is thus exhausted from the chamber 32 of the brake cylinder by reverse flow to the brake valve device 14 and thence to atmosphere by way of the usual exhaust port in the brake valve device 14. Whenever the pressure in the chamber 32 of the brake cylinder drops below the setting of the pressure maintaining valve device 46, the valve 87 will be unseated and fluid will be thereafter released from the chamber 32 also past the valve 87.

Since it was assumed that the car wheel 12 did not slip during the application of the brakes, it will be obvious that the pin valves 108 of the governor valve mechanism 19 will remain seated while the car decelerates under the application of the brakes. If the car wheel 12 begins to slip, however, while the brakes are applied as previously described, the governor mechanism 19 operates in the manner previously described to cause the pin valves 108 to unseat and thus exhaust fluid under pressure from the passage 109 in the axle 21 and from the passage 81 and piston chamber 49 of the valve unit 16. The charging valve 45 is unseated to supply fluid under pressure to the piston chamber 49 only so long as the pressure in the supply pipe 42 is increasing and operates to reseat the valve 76 when the pressure in the supply pipe 42 is established at a desired value and no further increase of the pressure in pipe 42 occurs. Accordingly, when the pin valves 108 of the governor mechanism 119 are unseated, the piston chamber 49 is rapidly vented to atmosphere and, consequently, the piston 48 is shifted in the left-hand direction by the higher pressure in the slide valve chamber 51 against the yielding resisting force of the spring 50 until the pin valve 61 seats to close the port 64 connecting the chamber 63 to the chamber 32 on the pressure side of the brake cylinder piston.

The check valve 66 is thereupon seated to cut off the further supply of fluid under pressure from the supply passage 65 into the slide valve chamber 51, and thus to the chamber 32 of the brake cylinder, and the slide valve 52 is shifted to lap the exhaust port 56 and to uncover the passage 39 to establish communication between the chamber 32 on the pressure side of the brake cylinder piston and the chamber 34 on the usual non-pressure side of the brake cylinder piston. Fluid under pressure is accordingly supplied from the chamber 32 to the chamber 34 by way of the passage 55, slide valve chamber 51, passage 39, pipe 36, and passage 38 until the pressures in the two chambers equalize.

When the pressures in the two chambers 32 and 34 are substantially equalized, the release spring 31 shifts the brake cylinder piston 27 in the right-hand direction into its release position shown and thus causes the pressure applying the brake shoes to the wheel 12 to be immediately relieved. Equalization of the pressures in the chambers 32 and 34 takes place sufficiently rapidly that the brakes are released from the car wheel 12 before the car wheel can decelerate, while slipping, to the locked-wheel state. Thus, before the car wheel 12 can attain the locked-wheel state and slide, it is accelerated back toward a speed corresponding to vehicle speed due to the immediate and rapid release of the brakes.

If the pin valves 108 of the governor mechanism 19 are not already seated due to the destruction of the partial vacuum in the space between the pistons 104 and 105 by the influx of air at atmospheric pressure through the port 135 in piston 104, the outward movement of the weighted arms of levers 127 and 128, due to the increase in rotative speed of the car wheel 12 when it accelerates back toward a speed corresponding to vehicle speed following slipping thereof, causes the valves 108 to seat and thus close off the exhaust of fluid under pressure from the passages 109 and 81 and the piston chamber 49 of the valve unit 16.

After a predetermined time, determined by the size of the restricted port 58 in the piston 48, the pressure of the fluid in the slide valve chamber 51 equalizes with that in the piston chamber 49 by flow through the port 58. Thereupon the spring 50 becomes effective to shift the piston 48 in the right-hand direction back toward its original position. The differential force of the originally established pressure maintained in the supply pipe 42 and supply passage 65 over the reduced pressure in slide valve chamber 51 holds the check valve 66 seated and, consequently, the spring 50 can only return the piston 48 and its stem 53 in the right-hand direction until the end of the stem 53 engages the inner seated face of the check valve 66. Such movement of the piston 48 and its stem 53 is sufficient however to shift the slide valve 52 so as to cut off the connection of the passage 39 to the slide valve chamber 51 and to reconnect passage 39 to exhaust port 56 through the cavity 57 in the slide valve.

It will thus be seen that fluid under pressure is exhausted from the chamber 34 at the usual non-pressure side of the brake cylinder piston 27 and that the pressure of equalization previously established between the chambers 32 and 34 on opposite sides of the brake cylinder piston 27 will remain established in the chamber 32 on the pressure side of the piston 27.

The degree of reduction of pressure in the chamber 32 on the pressure side of the brake cylinder piston 27 depends upon the pressure of equalization between the chambers 32 and 34. It will be obvious that the brake cylinder 11 may be of different sizes and proportions for different installations so that the relation between the volume of the chamber 32 and that of the chamber 34, and accordingly the pressure of equalization between the chambers for a given pressure initially established in chamber 32, may vary. The brake cylinder may be of such size and proportions, for example, that assuming a pressure of seventy-five pounds per square inch pressure to be established in the chamber 32 at the time that slipping of the car wheel 12 occurs, the pressure in the chamber 32 may be reduced, upon equalization flow to the chamber 34, to a pressure of fifty-five pounds per square inch pressure.

Since the pressure in the chamber 32 on the pressure side of the brake cylinder pressure 27 is thus greatly reduced, it will be apparent that it is exceedingly unlikely that a repetition of wheel-slipping will occur during the application of the brakes. Should the car wheel 12 again begin to slip, however, the piston 48 will again be shifted in the left-hand direction and communication again established between the chambers 32 and 34 to further reduce the pressure in the chamber 32 to the pressure of equalization with the chamber 34.

Since it is desirable to maintain in the chamber 32 of the brake cylinder 11 a pressure sufficient to provide adequate braking, the pressure maintaining valve device 46 is provided. If, therefore, the pressure in the chamber 32 of the brake cylinder is reduced below the setting of the pressure maintaining valve device 46 upon the slipping of the car wheel 12, the valve 87 opens to effect the supply of fluid under pressure to the chamber 32 in by-passing relation to the check valve 66 which remains seated. As long as the pin valve 61 on the piston 48 is seated however, fluid under pressure cannot be supplied to the chamber 32, fluid under pressure being supplied to the chamber 32 under the control of the pressure maintaining valve device 46 only when the piston 48 moves in the right-hand direction to unseat the pin valve 61.

The purpose of the pin valve 61 is to prevent the supply of fluid under pressure to the chamber 32 past the pressure maintaining valve device 46 while chamber 32 is connected to chamber 34 of the brake cylinder 11. Obviously, if fluid under pressure were supplied past the pressure maintaining valve device 46 to both chambers 34 and 32, that supplied to chamber 34 would be wasted because the chamber 34 is vented to atmosphere through the exhaust port 56 when the piston 48 is shifted in the right-hand direction following cessation of wheel-slipping.

The setting of the pressure maintaining valve device 46 is such as to cause seating of the valve 87 in response to a pressure in the chamber 32 of the brake cylinder 11 which is, under ordinary conditions, insufficient to cause sliding of the car wheel 12. However, if due to abnormal rail conditions, the car wheel 12 should slip when the pressure established in the chamber 32 in the brake cylinder is less than the setting of the pressure maintaining valve device 46, the pin valve 61 on the piston 48, being seated, is effective to prevent the supply of fluid under pressure to the chamber 32 past the pressure maintaining valve device 46 while the car wheel 12 is slipping.

It should be kept in mind that the self-lapping brake valve device 14 is effective to maintain a pressure in the supply pipe 42 and supply passage 65 which corresponds to the degree of displacement of the operating handle 41 out of its normal release position and that, therefore, should fluid under pressure leak from the brake cylinder chamber 32 during an application of the brakes, the pressure corresponding to the position of the operating handle 41 of the brake valve device 14 tends to be maintained in the chamber 32 of the brake cylinder. Furthermore, due to the pressure maintaining function of the brake valve device 14, and notwithstanding the supply of fluid under pressure from the supply passage 65 past the pressure maintaining valve device 46 to the chamber 32 of the brake cylinder following cessation of slipping of the car wheel, adequate pressure is maintained on the check valve 66 to maintain it in seated position and thus prevent the restoration of pressure in the brake cylinder chamber 32 to correspond to the original pressure established in the supply pipe 42.

When the brakes are released by operation of the operating handle 41 of the brake valve device 14 to release position, the reduction in the pressure in passage 65 on the face of the check valve 66 permits the spring 50 to shift the piston 48 into engagement with the annular shoulder 54 and thereby effect unseating of the check valve 66 against the yielding resistance of the spring 71 to restore the connection between the passage 65 and the slide valve chamber 51. Thus fluid under pressure may again be supplied past the check valve 66 to the slide valve chamber 51 and thence to the chamber 32 of the brake cylinder upon reapplication of the brakes in the manner previously described, as long as the car wheel 12 does not slip.

*Embodiment shown in Figs. 3, 4 and 5*

The embodiment of my invention shown in Figs. 3, 4 and 5 differs from that shown in Figs. 1 and 2 by the addition of a sanding device 141, of the type described and claimed in my copending application Serial No. 176,185, filed November 24, 1937, now Patent 2,155,214 and assigned to the assignee of the present application, arranged to be automatically controlled. It will be understood that other suitable types of sanding devices may be provided instead of the sanding device 141, the sanding device 141 being shown merely for purposes of illustration.

The sanding device 141 comprises a hopper 142 for containing a supply of sand 143, the hopper 142 having a tubular outlet portion at the lower end thereof on which a sleeve or tube 144 is slidably mounted in concentric relation. The hopper 142 is suitably carried on a part of the car truck, such as the side frame, which has a fixed relation with respect to the track rail and the tube 144 is supported and guided, as by a strut 146 having a guide ring 147 at the end thereof loosely surrounding the tube 144.

Carried on the lower end of the tube 144 is a shoe-nozzle 148, of suitable material such as rubber composition or a soft metal, which is adapted to be yieldingly urged downwardly into sealing contact with the track rail 149 by a coil spring 151 interposed between a flange 152 on the tube 144 and an annular recess 153 on the hopper 142.

The shoe-nozzle 148 is provided on the lower face thereof with a circular cavity 155 and extending longitudinally of the rail 149 from the cavity is a tapered groove or cavity 156 which opens at the rear end of the shoe-nozzle 148 to simulate a nozzle. As will be seen clearly in Figs. 4 and 5, the end opening of the tapered groove 156 is relatively small compared to the width of the rail 149 and is substantially centrally disposed with respect to the rail.

Sand is supplied by gravity from the hopper 142 and tube 144 to cavity 155 in the shoe-nozzle 148 under the control of a valve 158 which is formed preferably in the shape of an inverted cone and which seats on the lower end of the tube 144. The valve 158 may be operated, in response to the supply of fluid under pressure to a chamber 159 formed in a casing 161 that is suitably supported within the hopper 142, as by a movable abutment such as a piston 162, subject on one side to the pressure in the chamber 159 and having a stem 163, extending downwardly through the tubular portion of the hopper and through the tube 144, to the lower end of which the valve 158 is fixed.

The casing 161 is formed to provide a chamber 165 on the side of the piston 162 opposite to the chamber 159 and, disposed in the chamber 165 in concentric relation to the stem 163, is a coil spring 166 which yieldingly urges the piston 162 upwardly to effect seating of the valve 158 on the lower end of the tube 144 to prevent the dropping of sand from the tube 144 to the cavity 155 of the shoe-nozzle 148.

The spring 166 is stronger than the spring 151 so that, when the fluid under pressure is released from chamber 159, the spring 166 is not only effective to seat the valve 158 but also exerts an upward force on the tube 144 to overcome the spring 151 and thus raise the shoe-nozzle 148 upwardly out of contact with the track rail 149. Upon the supply of fluid under pressure to the chamber 159, the pressure acting on the piston 162 overcomes the spring 166, thus permitting the spring 151 to urge the tube 144 and shoe-nozzle 148 downwardly into contact with the track rail 149. Further downward movement of the piston 162, after the shoe-nozzle 148 engages the track rail is effective to unseat the valve 148 and permit the sand from the hopper to fall by gravity into the cavity 155 of the shoe-nozzle and to be expelled to the rail through the tapered groove 156.

It will be seen that the sanding operation depends on movement of the car, for unless the shoe-nozzle 148 moves along the rail, sand cannot and will not flow out of the tapered groove 156. Furthermore, by laying the sand on the rail in a ribbon or ridge of uniform cross-sectional area, a substantially uniform amount of sand is laid on each unit length of the track rail, for all speeds of travel of the car.

The supply of fluid under pressure to the chamber 159 of the sanding device 141 is under the control of the release and reapplication valve device 44 of the valve unit 16, and the release of fluid under pressure from the chamber 159 is effected under the control of the brake valve device 14.

As will be evident in Fig. 3, the casing 161 forming the chamber 159 is provided with an integrally formed or attached portion containing a loaded check valve 171 which is yieldingly biased into seated relation on an annular rib seat 172 by a compression spring 173. On the side of check valve 171, open to the inner seated area thereof is a chamber 174 which is constantly open to atmosphere through a restricted port 175.

On the opposite side of the check valve 171 is a chamber 176 containing the loading spring 173, chamber 176 being connected through a passage 177 to the chamber 159, and through a pipe 178 to the supply passage 65 in the casing of the valve unit 16. A one-way or check valve 179, illustrated as of the ball type, is provided to prevent the supply of fluid under pressure from the supply passage 65 ino the pipe 178. The check valve 179 unseats, however, to permit the exhaust of fluid under pressure from the pipe 178 into the supply passage 65.

In operation, whenever the slide valve 52 of the release and reapplication valve device 44 is shifted in the right-hand direction, in the manner previously described, following cessation of slipping the car wheel 12, fluid under pressure from the chamber 34 on the usual non-pressure side of the brake cylinder piston 27 is supplied to the chamber 159 of the sanding device 141 by way of the passage 38, pipe 36, passage 39, cavity 57 in the slide valve 52, passage and pipe 56, chamber 174, past the check valve 171 which is unseated against the yielding resisting force of the spring 173, chamber 176, and passage 177. The exhaust port 175 from the chamber 174 is sufficiently restricted to cause the pressure to build up in the chamber 174 and thus unseat the check valve 171. The spring 173 is relatively lightly tensioned and thus the valve 171 opens readily upon the build-up of pressure in chamber 174. Since the spring 173 is lightly tensioned, the pressure established in the chamber 159 of the sanding device 141 will be only slightly lower than the pressure of equalization between the chamber 34 of the brake cylinder and the chamber 159.

When the pressure in the chamber 159 and that in the chamber 174 are substantially equal, the spring 173 causes the check valve 171 to seat thereby preventing the back-flow of fluid under pressure from the chamber 159 through the exhaust port 175. After the check valve 171 seats, the pressure in the chamber 34 on the usual non-pressure side of the brake cylinder piston 27 is gradually exhausted to atmosphere through the restricted port 175. It will thus be apparent that the restricted port 175 delays the reapplication of the brakes on the car wheel which slipped, by delaying the exhaust of pressure from the chamber 34 on the non-pressure side of the brake cylinder piston, thereby adding to the delay effected by the restricted port 58 in the piston 48 of the release and reapplication valve device 44 and ensuring that the car wheel returns fully to vehicle speed before the brakes are re-applied thereon.

The pressure of the fluid acting in the chamber 159 on the piston 162 causes the shoe-nozzle 148 to be lowered into contact with the rail 149 and effects opening of the valve 158, in the manner previously described.

Assuming an adequate supply of sand in the hopper 142, it will be apparent that as long as the car continues in motion and sufficient pressure is maintained in the chamber 159, the sanding of the rails will continue. Obviously, when the car comes to a stop with the shoe-nozzle 148 remaining in contact with the track rail 149, the sand automatically ceases to flow out of the tapered groove 156 to the rail.

The sanding device 141 is operated automatically to prevent the sanding of the rails on starting by operation of the brake valve device 14 to effect release of the brakes. When the operator operates the brake valve 14 to release position, the reduction of the pressure in the supply passage 65 thereby effected permits the check valve 179 to unseat and release fluid under pressure from the chamber 159 of the sanding device 141 according to the reduction of the pressure in the supply passage 65. Upon sufficient reduction of the pressure in the chamber 159 of the sanding device 141, the spring 166 shifts the piston 162 upwardly to seat the valve 158 and raise the shoe-nozzle 148 out of contact with the track rail 149 against the yielding resistance of spring 151.

*Summary*

Summarizing, it will be seen that I have disclosed a brake equipment adapted to operate to prevent sliding of the car wheels by causing the fluid under pressure on the usual pressure side of the brake cylinder piston to flow rapidly to the space on the usual non-pressure side of the brake cylinder piston and reduce to the pressure of equalization, thus rendering the usual release spring of the brake cylinder effective to return the brake cylinder piston to release position to effect the rapid release of the brakes on a wheel which begins to slip. The equalization of pressures on opposite sides of the brake cylinder piston is effected under the control of a novel type of governor mechanism effectively responsive only to the slipping of a car wheel.

In a second embodiment of the invention, a sanding device is automatically controlled to sand the rails adjacent the wheels which slipped, upon the reapplication of the brakes following cessation of slipping.

While I have disclosed only two embodiments of my invention, it will be apparent that various omissions, additions or modifications may be made in the embodiments shown without departing from the spirit of my invention. It is, therefore, not my intention to limit the scope of my invention except as it is necessitated by the scope of the prior art.

Having now described my invention, what I claim as new and desire to secure by Letters Patent, is:

1. In a fluid pressure brake system for a vehicle, in combination, a brake cylinder having a piston and two chambers disposed respectively on opposite sides of the piston, means for supplying fluid under pressure to a chamber on one side of the piston, valve means operated upon a variation of pressure therein to connect said two chambers together, and means responsive to a vehicle wheel slipping condition for effecting a variation of pressure in said valve means.

2. In a fluid pressure brake system for a vehicle, in combination, a brake cylinder having a piston and two chambers disposed respectively on opposite sides of the piston, means for supplying fluid under pressure to one of said chambers to operate said piston to apply the brakes, means operative from a biased position to an operating position to connect said two chambers to effect an operation of said piston to reease the brakes, and operative when thereafter moved toward said biased position to cause operation of said piston to reapply the brakes, and wheel-slip detecting means for controlling operation of said last means.

3. A vehicle brake equipment comprising a brake cylinder having a piston yieldingly urged to a position to effect release of the brakes on a vehicle wheel upon substantial equalization of the fluid pressures on the braking pressure side and the non-pressure side of the piston and operative, upon the supply of fluid under pressure to the pressure side thereof, in a direction to effect application of the brakes on the vehicle wheel, means operative to cause fluid under pressure to be supplied to said pressure side of the piston to effect application of the brakes on the vehicle wheel, valve means operative to establish communication through which fluid under pressure flows from said pressure side of the brake cylinder piston to the non-pressure side thereof to equalize the pressure on opposite sides thereof, and means operative upon the slipping of the vehicle wheel for effecting operation of said valve means.

4. A vehicle brake equipment comprising a brake cylinder having a piston which is yieldingly urged to a position for effecting release of the brakes on a vehicle wheel upon substantial equalization of the fluid pressures on the braking pressure side and the non-pressure side of the piston and shifted in a direction to cause application of the brakes on the vehicle wheel when fluid under pressure is supplied to the pressure side thereof, valve means normally effective to establish communuication through whch fluid under pressure is supplied to the pressure side of the brake cylinder and also to establish communication through which the non-pressure side of the brake cylinder piston is connected to atmosphere and operative to close both of said communications and establishing a third communication through which fluid under pressure flows from the pressure side of the brake cylinder to the non-pressure side thereof to equalize the pressure on opposite sides of the piston, and means operative upon the slipping of the vehicle wheel for effecting operation of said valve means.

5. A vehicle brake equipment comprising a brake cylinder having a piston which is shiftable in one direction to effect application of the brakes on a vehicle wheel upon the supply of fluid under pressure to the braking pressure side thereof, resilient means effective to shift the piston in the opposite direction to effect release of the brakes upon a reduction of the unbalanced force of fluid pressure acting on the pressure side of the piston, a valve normally in a position to establish communication through which fluid under pressure is exhausted from the non-pressure side of the brake cylinder piston, fluid pressure responsive means effective upon a variation of pressure acting thereon to shift the said valve to another position in which said exhaust communication is closed and another communication is established through which fluid under pressure acting on the said pressure side of the brake cylinder piston flows to the non-pressure side of the piston to equalize the pressure on opposite sides of the piston, and means operative upon the slipping of the vehicle wheel for effecting a variation of pressure on the fluid pressure responsive means.

6. A vehicle brake equipment comprising a brake cylinder having a piston yieldingly urged to a position to effect release of the brakes on a vehicle wheel upon substantial equalization of the fluid pressure on the braking pressure and the non-pressure sides of the piston and shifted in a direction to effect application of the brakes on the vehicle wheel upon the supply of fluid under pressure to the braking pressure side thereof, a valve normally in a position to establish a communication through which fluid under pressure is supplied to the pressure side of the brake cylinder piston to effect application of the brakes, means operative upon slipping of the vehicle wheel to cause said valve to close the said communication and thereby prevent the supply of fluid under pressure to the pressure side of the brake cylinder piston, and means operative upon slipping of the vehicle wheel to cause a reduction of the pressure on the pressure side of the brake cylinder piston, said valve being subject, when in its position to close said communication, to the opposing pressures of the fluid acting on the pressure side of the brake cylinder piston and the pressure of fluid supplied into the said communication and so constructed and arranged as to be held in its position to close said communication as long as the pressure supplied into the communication exceeds the pressure acting on the pressure side of the brake cylinder piston by at least a certain uniform amount.

7. A vehicle brake equipment comprising a brake cylinder having a piston shiftable in a direction to effect application of the brakes on a vehicle wheel upon the supply of fluid under pressure to the braking pressure side thereof and yieldingly urged in the opposite direction to effect release of the brakes when the pressure of the fluid on the pressure side and on the non-pressure side of the piston are substantially equalized, means providing a communication through which fluid under pressure is supplied to the pressure side of the brake cylinder piston to effect application of the brakes, and a valve mechanism normally effective to open said communication and at the same time establish a second communication through which fluid under pressure is exhausted from the non-pressure side of the brake cylinder piston, said valve mechanism being operative, when the vehicle wheel slips, for closing both said communications and establishing a third communication through which fluid under pressure flows from the pressure side to the non-pressure side of the brake cylinder piston to equalize the pressures on opposite sides thereof and operative, upon cessation of slipping of the vehicle wheel, to close said third communication and open said second communication without opening said first communication.

8. A vehicle brake equipment comprising a brake cylinder having a piston shiftable in response to the pressure of fluid supplied to the braking pressure side thereof in a direction to effect application of the brakes on a vehicle wheel and yieldably urged in the opposite direction to effect release of the brakes upon substantial equalization of the fluid pressure on the braking pressure and the non-pressure sides of the piston, valve means normally in a position to establish communication through which fluid under pressure is released from the non-pressure side of the piston and operative to a position for closing said communication and establishing a second communication through which fluid under pressure flows from the pressure side to the non-pressure side to equalize the pressure on opposite sides of the piston, means operative upon slipping of the vehicle wheel for effecting operation of the valve means from its normal position to the last said position, and means for delaying the return of said valve means to the position for establishing the first said communication and closing said second communication until the vehicle wheel has accelerated back to a speed corresponding to vehicle speed.

9. A vehicle brake equipment comprising a brake cylinder having a piston shiftable in response to the pressure of fluid supplied to the braking pressure side thereof in a direction to effect application of the brakes on a vehicle wheel and yieldably urged in the opposite direction to effect release of the brakes upon substantial equalization of the fluid pressures on the pressure side and the non-pressure sides of the piston, means for causing fluid under pressure to be supplied to the pressure side of the brake cylinder piston to effect application of the brakes on the vehicle wheel, a valve normally establishing a communication through which fluid under pressure is released from the non-pressure side of the brake cylinder piston, a movable abutment subject on opposite sides to fluid at substantially the same pressure as long as a vehicle wheel does not slip for maintaining said valve in said normal position, means effective upon slipping of the vehicle wheel for effecting a reduction of the pressure on one side of the abutment to cause it to be shifted and thereby operate the said valve to a different position in which the said communication is closed and a second communication is opened through which fluid under pressure from the pressure side of the brake cylinder piston flows to the non-pressure side and thereby equalizes the pressure on opposite sides thereof, and timing means effective to delay the movement of the said abutment to effect shifting of the said valve to a position for closing the said second communication and reestablishing the first said communication through which fluid under pressure is released from the non-pressure side of the brake cylinder until the vehicle wheel returns to a speed corresponding to vehicle speed following slipping.

10. A vehicle brake equipment comprising a brake cylinder having a piston shiftable in a direction to effect application of the brakes on a vehicle wheel upon the supply of fluid under pressure to the braking pressure side thereof and yieldably urged in the opposite direction to effect release of the brakes upon substantial equalization of fluid pressure on the pressure side and the non-pressure side of the piston, means for causing fluid under pressure to be supplied to the pressure side of the brake cylinder piston to effect application of the brakes, a valve normally establishing a communication through which fluid under pressure is released from the non-pressure side of the brake cylinder piston, a movable abutment subject on opposite sides to fluid at substantially the same pressure, as long as a vehicle wheel does not slip, for maintaining said valve in said normal position, means effective upon slipping of the vehicle wheel for causing a reduction of the pressure on one side of the abutment to cause it to be shifted and thereby operate the said valve to a different position in which the said communication is closed and a second communication is opened through which fluid under pressure from the pressure side of the brake cylinder piston flows to the non-pressure side of the brake cylinder piston and thereby equalizes the pressure on opposite sides of the piston, and a restricted port in said abutment through which fluid under pressure flows to the said one side of the abutment from the opposite side thereof to equalize the pressure on opposite sides thereof for delaying the return of said abutment to shift the said valve to a position for closing the second communication and opening the first said communication.

11. A vehicle brake equipment comprising a brake cylinder having a piston shiftable in response to the pressure of fluid supplied to one side thereof in a direction to effect application of the brakes on a vehicle wheel and yieldably urged in the opposite direction to effect release of the brakes upon substantial equalization of the fluid pressure on opposite sides thereof, a valve effective in one position to establish a communication through which fluid under pressure is exhausted from the side of the brake cylinder opposite said one side and effective in a second position to close the said communication and establish a second communication through which fluid under pressure is supplied from the said one side to the opposite side of the brake cylinder piston to equalize the pressure on the opposite sides thereof, a movable abutment for operating said valve subject on one side to the pressure in the brake cylinder, resilient means on the opposite side of the abutment yieldingly resisting movement of the abutment in response to brake cylinder pressure, a restricted port in said abutment for permitting a relatively slow rate of flow of fluid under pressure from the said one side of the abutment to the opposite side thereof, a charging valve device effective upon the supply of fluid under pressure to the brake cylinder to effect the supply of fluid under pressure to the side of said abutment opposite said one side at a relatively rapid rate to maintain the pressure on opposite sides thereof substantially equalized, said abutment being effective to maintain said valve in said one position when the pressures on the opposite sides thereof are substantially equalized and operative upon a reduction of the fluid pressure on the side of the abutment opposite said one side to shift the said valve to the said second position, means effective when the vehicle wheel slips for effecting a reduction in the pressure of the fluid on the side of the abutment opposite said one side, the restricted port in the abutment being effective to permit equalization of the pressures on opposite sides of the abutment after a predetermined time by flow of fluid under pressure therethrough from the said one side to the opposite side of the abutment whereby said resilient means becomes effective to shift said abutment to move the said valve to said one position.

12. A vehicle brake equipment comprising a brake cylinder having a piston shiftable in a direction to effect application of the brakes on a vehicle wheel upon the supply of fluid under pressure to one side of the piston and yieldably urged in the opposite direction to effect release of the brakes upon substantial equalization of fluid pressure on opposite sides thereof, a supply pipe chargeable with fluid at different pressures, valve means normally in a position to establish communication through which fluid under pressure is supplied from the supply pipe to the said one side of the brake cylinder piston and also to establish a second communication through which fluid under pressure is exhausted from the side of the brake cylinder piston opposite said one side, means responsive to the slipping of the vehicle wheel for effecting operation of the valve means to close the first said communication and said second communication and to establish a third communication through which fluid under pressure flows from the said one to the opposite side of the brake cylinder piston to equalize the pressures on opposite sides thereof, and means for preventing the return of the said valve means to the said normal position thereof following cessation of slipping of the vehicle wheel unless the pressure in the said supply pipe is reduced below that on the said one side of the brake cylinder piston, said valve means being operative following cessation of slipping of the vehicle wheel when the pressure in the supply pipe exceeds that on the said one side of the brake cylinder piston to a position in which the first said communication is closed and the said second communication is open.

13. A vehicle brake equipment comprising a brake cylinder having a piston shiftable in a direction to effect application of the brakes on a vehicle wheel upon the supply of fluid under pressure to one side thereof and yieldably urged in the opposite direction to effect release of the brakes upon substantial equalization of the fluid pressure on opposite sides of the brake cylinder piston, means operative to cause fluid under pressure to be supplied to the said one side of the brake cylinder piston to effect an application of the brakes, valve means operative upon the slipping of the vehicle wheel to prevent the further supply of fluid under pressure to the said one side of the brake cylinder piston and to establish a communication through which fluid under pressure flows from the said one side to the opposite side of said brake cylinder piston to equalize the fluid pressure on opposite sides thereof whereby the piston is returned in a direction to effect release of the brakes, said valve means being operative upon cessation of slipping of the vehicle wheel for exhausting fluid under pressure from the side of the brake cylinder piston opposite said one side whereby reapplication of the brakes is effected to a degree corresponding to the reduced pressure on the said one side of the piston, and means for supplying fluid under pressure to the said one side of the brake cylinder to maintain at least a certain pressure therein during the application of the brakes following cessation of slipping of the wheel.

14. A vehicle brake equipment comprising a brake cylinder having a piston shiftable in a direction to effect application of the brakes on a vehicle wheel upon the supply of fluid under pressure to one side thereof and yieldably urged in the opposite direction to effect release of the brakes upon substantial equalization of the fluid pressures on opposite sides of the brake cylinder piston, means operative to cause fluid under pressure to be supplied to the said one side of the brake cylinder piston to effect an application of the brakes, valve means operative upon the slipping of the vehicle wheel to prevent the further supply of fluid under pressure to the said one side of the brake cylinder piston and to establish a communication through which fluid under pressure flows from the said one side to the opposite side of said brake cylinder piston to equalize the fluid pressures on opposite sides thereof whereby the piston is returned in a direction to effect release of the brakes, said valve means being operative upon cessation of slipping of the vehicle wheel for exhausting fluid under pressure from the side of the brake cylinder piston opposite said one side whereby re-application of the brakes is effected to a degree corresponding to the reduced pressure on the said one side of the piston, means providing a communication through which fluid under pressure may be supplied to the said one side of the brake cylinder in by-passing relation to the valve means, and means responsive to a certain uniform pressure on the said one side of the brake cylinder piston for closing said communication.

15. A vehicle brake system comprising a brake cylinder having a piston shiftable in a direction to effect application of the brakes on a vehicle wheel upon the supply of fluid under pressure to one side thereof and yieldably urged in the opposite direction to effect release of the brakes upon substantial equalization of the fluid pressures on opposite sides of the brake cylinder piston, means operative to cause fluid under pressure to be supplied to the said one side of the brake cylinder piston to effect an application of the brakes, valve means operative upon the slipping of the vehicle wheel to prevent the further supply of fluid under pressure to the said one side of the brake cylinder piston and to establish a communication through which fluid under pressure flows from the said one side to the opposite side of said brake cylinder piston to equalize the fluid pressures on opposite sides thereof whereby the piston is returned in a direction to effect release of the brakes, said valve means being operative upon cessation of slipping of the vehicle wheel for exhausting fluid under pressure from the side of the brake cylinder piston opposite said one side whereby re-application of the brakes is effected to a degree corresponding to the reduced pressure on the said one side of the piston, means providing a communication through which fluid under pressure may be supplied to the said one side of the brake cylinder in by-passing relation to the valve means, means responsive to a certain uniform pressure on the said one side of the brake cylinder for closing said by-pass communication, and a valve operative, when the vehicle wheel slips, to close said by-pass communication to prevent the supply of fluid under pressure to the said one side of the brake cylinder piston and operative when the vehicle wheel substantially ceases to slip for opening said by-pass communcation.

16. In a vehicle brake system, in combination, a brake cylinder having a piston yieldingly urged to a position for effecting release of the brakes on a vehicle wheel upon substantial equalization of fluid pressures on opposite sides of the piston and shiftable in a direction to effect application of the brakes on the wheel upon the supply of fluid under pressure to one side thereof, means operative to cause fluid under pressure to be supplied to the said one side of the brake cylinder piston to effect an application of the brakes on the vehicle wheel, a fluid pressure operated valve device operated, in response to a variation of fluid pressure acting thereon, out of a certain normal position in which it connects the side of the brake cylinder piston opposite said one side to atmosphere, to a position in which it connects the said one side to the opposite side of the brake cylinder piston to cause flow of fluid under pressure from the said one side to the opposite side of the brake cylinder piston to equalize the pressures, and means rotatable according to the speed of rotation of the vehicle wheel and effective to cause a variation of the pressure acting on said valve device only when the speed of rotation of the vehicle wheel reduces at a rate exceeding a certain rate.

17. In a vehicle brake system, in combination, a vehicle wheel, an axle for said wheel having a passage therein, a brake cylinder operative upon the supply of fluid under pressure thereto to effect an application of the brakes on the vehicle wheel, fluid pressure operated means subject to the pressure of the fluid in a chamber and operative upon a reduction of the pressure in the chamber for effecting a reduction of the pressure in the brake cylinder, means providing communication between said chamber and the passage in said axle, a normally seated valve operative to an unseated position to effect the exhaust of fluid under pressure from the passage in the axle and accordingly a reduction of the pressure in said chamber, and means rotatable according to the speed of rotation of the vehicle wheel for effecting the unseating of the said valve only when the vehicle wheel reduces in rotative speed at a rate in excess of a certain rate of change of speed.

18. A vehicle brake equipment comprising, in combination, a brake cylinder having a piston yieldingly urged to a position to effect release of the brakes on a vehicle wheel upon substantial equalization of the pressure on opposite sides of the piston and shiftable in a direction to effect application of the brakes on the vehicle wheel upon the supply of fluid under pressure to one side thereof, means for effecting the supply of fluid under pressure to said one side of the brake cylinder piston to effect application of the brakes, means operative upon the slipping of the vehicle wheel for establishing a communication through which fluid under pressure flows from the said one side to the opposite side of the brake cylinder piston to equalize the pressure on opposite sides thereof and thereby effect the release of the brakes and operative when the vehicle wheels return to a speed corresponding substantially to vehicle speed for closing said communication and establishing a different communication through which fluid under pressure is released from the opposite side of the brake cylinder piston to effect reapplication of the brakes, and means for restricting the rate of release of fluid under pressure from the opposite side of the brake cylinder piston through the last said communication to limit the rate of increase of the degree of the application of the brakes to a relatively slow rate upon reapplication following slipping of the vehicle wheel.

19. A vehicle brake equipment comprising means for effecting application and release of the brakes on the vehicle, means conditioned responsively to the slipping of a vehicle wheel during the application of the brakes for effecting the release of the brakes on the slipping wheel and conditioned subsequently as the slipping wheel accelerates toward a speed corresponding to vehicle speed due to release of the brakes to cause the reapplication of the brakes on the slipping wheel, and means for preventing reapplication of the brakes on the slipping wheel before it returns fully to a speed corresponding to vehicle speed, notwithstanding the conditioning of the last said means to cause reapplication of the brakes on the slipping wheel.

20. A vehicle brake equipment comprising means operative to effect application and release of the brakes on the vehicle, control means operative during an application of the brakes to effect release and reapplication of the brakes on a vehicle wheel, means responsive to the slipping of the vehicle wheel for causing the said control means to effect the release of the brakes on the slipping wheel when the wheel begins to slip and then reapplication of the brakes on the slipping wheel as it returns toward a speed corresponding to vehicle speed due to the release of the brakes, and means for delaying the operation of said control means in response to the operation of the wheel-slip responsive means to cause reapplication of the brakes on the slipping wheel until after the slipping wheel returns fully to a speed corresponding to vehicle speed.

21. In a vehicle brake system, in combination, a brake cylinder having a piston yieldingly urged to a position for effecting release of the brakes on a vehicle wheel upon substantial equalization of fluid pressures on opposite sides of the piston and shiftable in a direction to effect application of the brakes on the wheel upon the supply of fluid under pressure to one side thereof, means operative to cause fluid under pressure to be supplied to the said one side of the brake cylinder piston to effect an application of the brakes on the vehicle wheel, a fluid pressure operated valve device operated, in response to a variation of fluid pressure acting thereon, out of a certain normal position in which it connects the side of the brake cylinder piston opposite said one side to atmosphere, to a position in which it connects the said one side to the opposite side of the brake cylinder piston to cause flow of fluid under pressure from the said one side to the opposite side of the brake cylinder piston to equalize the pressures, and means effective to cause a variation of the pressure acting on said valve device only when the speed of rotation of the vehicle wheel reduces at a rate exceeding a certain rate.

22. In a vehicle brake system, in combination, a vehicle wheel, an axle for said wheel having a passage therein, a brake cylinder operative upon the supply of fluid under pressure thereto to effect an application of the brakes on the vehicle wheel, fluid pressure operated means subject to the pressure of the fluid in a chamber and operative upon a reduction of the pressure in the chamber for effecting a reduction of the pressure in the brake cylinder, means providing communication between said chamber and the passage in said axle, a normally seated valve operative to an unseated position to effect the exhaust of fluid under pressure from the passage in the axle and accordingly a reduction of the pressure in said chamber, and means for effecting the unseating of the said valve only when the vehicle wheel reduces in rotative speed at a rate in excess of a certain rate of change of speed.

23. A vehicle brake equipment comprising means operative to effect application and release of the brakes on the vehicle, control means operative during an application of the brakes to effect release and reapplication of the brakes on a vehicle wheel, means responsive to the slipping of the vehicle wheel for causing the said control means to effect the release of the brakes on the slipping wheel when the wheel begins to slip and then reapplication of the brakes on the slipping wheel as it returns toward a speed corresponding to vehicle speed due to the release of the brakes, and pneumatic timing means for delaying the operation of said control means in response to the opertion of the wheel-slip responsive means to cause reapplication of the brakes on the slipping wheel until after the slipping wheel returns fully to a speed corresponding to vehicle speed.

BURTON S. AIKMAN.